United States Patent
Bufe, III

(10) Patent No.: US 10,642,935 B2
(45) Date of Patent: May 5, 2020

(54) IDENTIFYING CONTENT AND CONTENT RELATIONSHIP INFORMATION ASSOCIATED WITH THE CONTENT FOR INGESTION INTO A CORPUS

(71) Applicant: International Business Machines Corporation, Armonk, NY (US)

(72) Inventor: John P. Bufe, III, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 14/275,484

(22) Filed: May 12, 2014

(65) Prior Publication Data

US 2015/0324350 A1    Nov. 12, 2015

(51) Int. Cl.
  *G06F 17/27* (2006.01)
  *G06F 17/28* (2006.01)
  *G06F 16/2457* (2019.01)
  *G06F 16/33* (2019.01)
  *G06F 16/332* (2019.01)

(52) U.S. Cl.
  CPC .... *G06F 17/2785* (2013.01); *G06F 16/24578* (2019.01); *G06F 16/3329* (2019.01); *G06F 16/3344* (2019.01); *G06F 17/28* (2013.01)

(58) Field of Classification Search
  CPC ... G06F 17/2785; G06F 17/28; G06F 17/2755
  See application file for complete search history.

(56) References Cited

U.S. PATENT DOCUMENTS

| 8,271,542 | B1 | 9/2012 | London |
| 8,560,567 | B2 | 10/2013 | Azzam |
| 8,577,866 | B1 | 11/2013 | Osinga |
| 8,589,399 | B1 * | 11/2013 | Lee ............ G06F 16/313 707/737 |

(Continued)

FOREIGN PATENT DOCUMENTS

| WO | WO2008/016915 A2 | 2/2008 |
| WO | WO2012/103129 A1 | 8/2012 |

OTHER PUBLICATIONS

"EMMA—Electronic Municipal Market Access", http://emma.msrb.org, retrieved Nov. 6, 2013, 1 page.

(Continued)

*Primary Examiner* — Vu B Hang
(74) *Attorney, Agent, or Firm* — Sean M. Douglass

(57) ABSTRACT

A mechanism is provided, in a data processing system comprising a processor and a memory configured to implement a natural language processing (NLP) system, for identifying content relationship for content copied by a content identification mechanism. The content identification mechanism identifies content from a website and then identifies relationship content information associated with a current web page where the content is found. The content identification mechanism modifies a file structure associated with the content with the relationship content information. The content identification mechanism identifies one or more classification identifiers in order to classify the content. Finally, the content identification mechanism transmits the content and the file structure to a specific corpus based on the one or more classification identifiers.

19 Claims, 6 Drawing Sheets

(56) References Cited

U.S. PATENT DOCUMENTS

| | | |
|---|---|---|
| 9,704,099 B2 | 7/2017 | Koll |
| 2002/0111934 A1* | 8/2002 | Narayan .................. G06F 9/548 |
| 2003/0069880 A1* | 4/2003 | Harrison ............. G06F 16/3334 |
| 2004/0044962 A1* | 3/2004 | Green .................... G06F 16/951 |
| | | 715/234 |
| 2004/0205076 A1* | 10/2004 | Huang ................... G06F 16/951 |
| 2006/0206472 A1* | 9/2006 | Masuichi ............. G06F 17/2785 |
| 2007/0282872 A1* | 12/2007 | Probst ................... G06F 17/241 |
| 2009/0070311 A1* | 3/2009 | Feng .................... G06F 16/3329 |
| 2009/0287678 A1 | 11/2009 | Brown et al. |
| 2010/0312650 A1* | 12/2010 | Pinckney ........... G06Q 30/0269 |
| | | 705/14.66 |
| 2011/0125734 A1 | 5/2011 | Duboue et al. |
| 2012/0078826 A1* | 3/2012 | Ferrucci ................. G06N 7/005 |
| | | 706/12 |
| 2012/0191692 A1* | 7/2012 | Wang .................... G06F 16/958 |
| | | 707/709 |
| 2013/0007055 A1 | 1/2013 | Brown et al. |
| 2013/0018652 A1 | 1/2013 | Ferrucci et al. |
| 2013/0041920 A1* | 2/2013 | Bufe ..................... G06F 16/358 |
| | | 707/777 |
| 2013/0066886 A1 | 3/2013 | Bagchi et al. |
| 2014/0006012 A1* | 1/2014 | Zhou ................... G06F 16/3329 |
| | | 704/9 |
| 2014/0120513 A1* | 5/2014 | Jenkins .................. G06F 17/27 |
| | | 434/362 |

OTHER PUBLICATIONS

"Web Page Metadata Framework", IBM Corporation, www.IP.com, IPCOM000138268D, Jul. 13, 2006, 9 pages.

High, Rob, "The Era of Cognitive Systems: An Inside Look at IBM Watson and How it Works", IBM Corporation, http://ip.com/pdf/redbook/REDP495500.pdf, 2012, 16 pages.

Yuan, Michael J., "Watson and heatlchare", IBM Corporation, developerWorks, http://www.ibm.com/developerworks/industry/library/ind-watson/, Apr. 12, 2011, pp. 1-14.

Zhu, Wei-Dong et al., "IBM Content Analytics Version 2.2, Discovering Actionable Insight from Your Content", Redbooks, ibm.com/redbooks, May 2011, 698 pages.

* cited by examiner

- ▷ ☐ CITY OF CHICAGO SECOND LIEN WATER REVENUE BONDS PROJECT, AND REFUNDING SERIES 2010A (TAX EXEMPT) (IL) — 320
  - ▷ ☐ Continuing Disclosure — 302
    - △ ☐ ADVANCE REFUNDING DOCUMENTS — 318
    - △ ☐ EVENT NOTICES — 304
    - ▷ ☐ FINANCIAL INFORMATION & DOCUMENTS — 306
      - ▷ ☐ Annual Financial Information and Operating Data
        - ☐ Financial Operating Filing for the year ended 12-31-2010 posted 07-18-2011.pdf
      - ▷ ☐ Annual Financial statements or CAFR — 308
        - ☐ Financial Operating Filing for the year ended 12-31-2010 posted 07-18-2012.pdf
        - ☐ Financial Operating Filing for the year ended 12-31-2011 Document 1 posted 07-25-2012.pdf
        - ☐ Financial Operating Filing for the year ended 12-31-2011 Document 2 posted 07-25-2012.pdf
  - ▷ ☐ Official Statement — 310
    - ☐ Official Statement posted 11-09-2010.pdf
  - ▷ ☐ Ratings — 312
    - ☐ Fitch.csv
    - ☐ S&P.csv
  - ▷ ☐ Trade Activity — 314
    - ☐ TradeActivity.csv
- ▷ ☐ CITY OF CHICAGO SECOND LIEN WATER REVENUE BONDS PROJECT SERIES 2012 (IL) — 316

*FIG. 3*

IDENTIFYING CONTENT AND CONTENT RELATIONSHIP INFORMATION ASSOCIATED WITH THE CONTENT FOR INGESTION INTO A CORPUS

BACKGROUND

The present application relates generally to an improved data processing apparatus and method and more specifically to mechanisms for identifying content relationship for content copied by a content identification mechanism.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, natural language processing (NLP) is being utilized to enable computers to derive meaning from human or natural language input. Utilizing NLP, large chunks of text are analyzed, segmented, summarized, and/or translated in order to alleviate and expedite a user's identification of relevant information. Additionally, recent research has been directed to generating Question and Answer (QA) systems which takes an input question, analyzes it, and returns results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system comprising a processor and a memory configured to implement a natural language processing (NLP) system, is provided for identifying content relationship for content copied by a content identification mechanism. The illustrative embodiment identifies content from a website using natural language processing. The illustrative embodiment then identifies relationship content information associated with a current web page where the content is found. The illustrative embodiment modifies a file structure associated with the content with the relationship content information. The illustrative embodiment identifies one or more classification identifiers in order to classify the content. The illustrative embodiment transmits the content and the file structure to a specific corpus in the NLP system based on the one or more classification identifiers.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 depicts one example of the information obtained and maintained by a content identification mechanism in searching a website in accordance with the illustrative embodiment;

DETAILED DESCRIPTION

Figure 1:
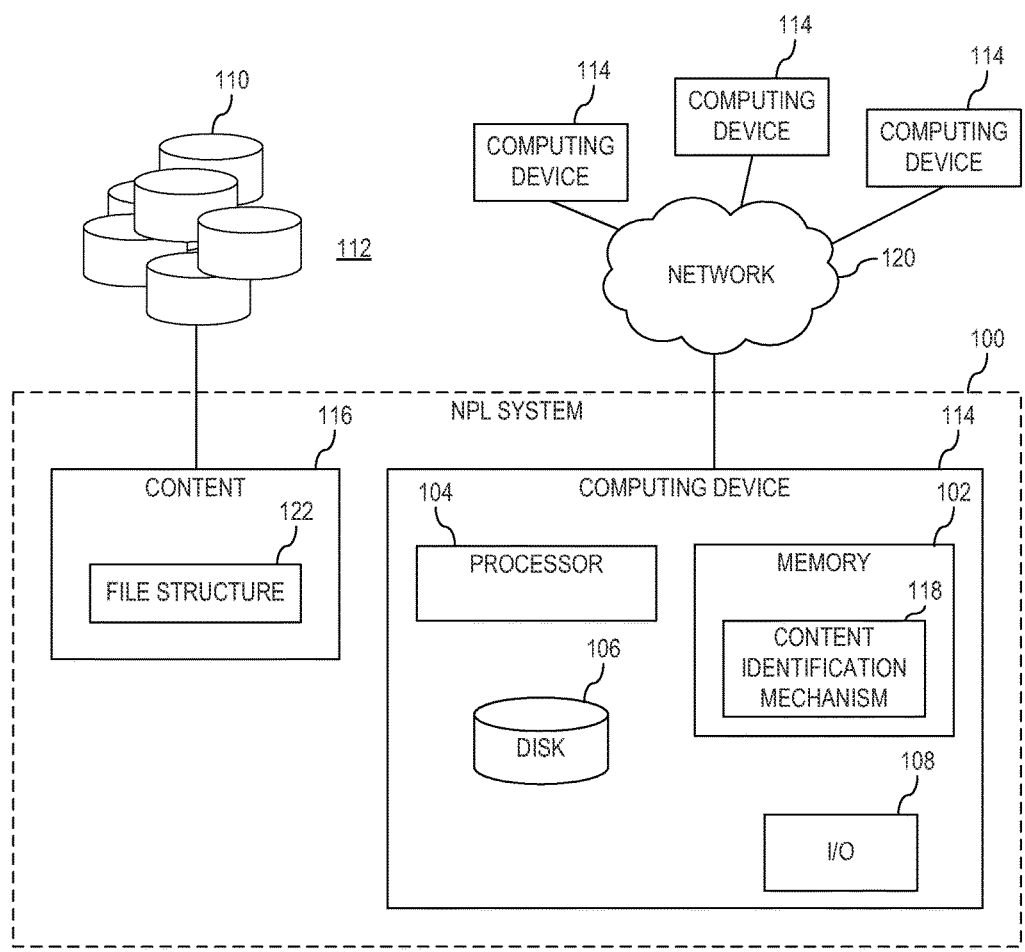
FIG. 1 depicts a schematic diagram of one embodiment of a QA system in accordance with an illustrative embodiment.

Natural language processing (NLP) systems require a significant amount of compute power to analyze a natural language question and determine the results from candidate findings. The identified candidate findings, as well as the other information from which the candidate findings are identified, is obtained from information sources, such as media, blogs, personal experiences, books, journal and magazine articles, expert opinions, encyclopedias, web pages, or the like. With regard to information sources that are available via the Internet, such as media, blogs, web pages, or the like, these information sources frequently contain content, such as documents, videos, audio files, recordings, pictures, artifacts, entries, data, or the like, hereinafter referred to collectively as content, available for downloading. Current Internet bots, such as web crawlers, web scrapers, web spider, an ant, an automatic indexer, or the like, "browse," "crawl," "scrape," or the like, hereinafter referred to collectively as "browse," these information sources to retrieve and ingest content from these information sources. However, these tools generally store the retrieved content in a flat directory, which may lose certain metadata describing the content and/or a relation of the content to other content that would typically have been associated with a given web page. This metadata may be vital for later analysis by NLP systems.

Thus, the illustrative embodiments provide for identifying content relationship for content copied by a content identification mechanism. Using contextual clues identified from the information sources themselves, the illustrative embodiments identify and/or approximate the intended structure of the content and store the identified and/or approximated structure along with the retrieved and ingested content. Thus, the illustrative embodiments maintain a file structure inherent to the retrieved content as well as the content's relationship to other retrieved content based on an original context of the content. That is, the inherency of the file structure indicates that no external information is required to derive the relationships and connections between the content, such that content found on web sites has information; either directly identified or in associated metadata, inherent to the web site that the content is attributed to.

With the mechanisms of the illustrative embodiments, a content identification mechanism uses natural language processing (NLP) to browse one or more websites in order to identify one or more pieces of content to be ingested to a corpus within a corpora and/or knowledge domain. In accordance with the illustrative embodiments, the content identification mechanism may be an Internet bot, a web crawler, a web scraper, a web spider, an ant, an automatic indexer, or the like. As the content identification mechanism browses a particular website and identifies particular content to be ingested, the content identification mechanism maintains information regarding the path to a current page where the content is found. The content identification mechanism modifies a file structure that is associated with the content either through generating a new file structure with path information as well as other identified content, augmenting an existing file structure with new information, and/or updating an existing file structure with a change in the path information or other identified content. Additionally, through parsing, structural analysis, hierarchical analysis, concept extraction, or the like, the content identification mechanism maintains a set of cross reference information for the content as well as any other content identified on the website, which is also stored in the file structure. The content identification mechanism updates the file structure associated with the identified content with this cross reference information. Further, on each individual web page where content is located, the content identification mechanism also identifies major headings and other grouping structures in order to classify the content via a classification identifier, so that the identified content is placed into an appropriate corpus within a corpora and/or knowledge domain. The content identification mechanism then stores the content and its related data structure and/or metadata into an appropriate corpus based on the identified classification information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one embodiment of a natural language processing (NLP) system 100 in accordance with an illustrative embodiment. The depicted NLP system 100 includes various components, described in more detail below, that are capable of performing the functions and operations described herein. In one embodiment, at least some of the components of the NLP system 100 are implemented in a computer system. For example, the functionality of one or more components of the NLP system 100 is implemented by computer program instructions stored on a computer memory device 102 and executed by a processing device, such as processor 104. The NLP system 100 includes other components, such as a disk storage drive 106, and input/output devices 108, and at least one corpus 110 with a corpora or knowledge domain 112. Some or all of the components of the NLP system 100 are stored on a single computing device 114 or on a network of computing devices 114, including a wireless communication network 120. The NLP system 100 includes more or fewer components or subsystems than those depicted herein. In some embodiments, the NLP system 100 is used to implement the methods described herein and may be augmented or configured to implement the additional operations, functionality, and features described hereafter with regard to the illustrative embodiments describes in conjunction with the subsequent figures.

In one embodiment, the NLP system 100 includes at least one computing device 114 with a processor 104 for performing the operations described herein in conjunction with the NLP system 100. The processor 104 includes a single processing device or multiple processing devices. The processor 104 may have multiple processing devices in different computing devices 114 over a network such that the operations described herein are performed by one or more computing devices 114. The processor 104 is connected to and in communication with the memory device 102. In some embodiments, the processor 104 stores and accesses data on the memory device 102 for performing the operations described herein. The processor 104 is also connected to a storage disk 106, which is used for data storage, for example, for storing data from the memory device 102, data used in the operations performed by the processor 104, and software for performing the operations described herein.

In one embodiment, the NLP system 100 imports content 116. In accordance with the illustrative embodiments, processor 104 executes content identification mechanism 118, which uses natural language processing (NLP) to browse one or more websites located on other ones of computing devices 114 via network 120 in order to identify one or more pieces of content 116 to be ingested to corpus 110 within a corpora and/or knowledge domain 112. As content identification mechanism 118 browses a particular website located on other ones of computing devices 114 and identifies a particular content 116, content identification mechanism 118 maintains information regarding the path to a current web page where content 116 is found. That is, content found on web sites has information; either directly identified or in associated metadata, inherent to the web site that is attributed to the content. This information may be found either in a Uniform Resource Locator (URL) of the web page, an html of the web page, or the like. Content identification mechanism 118 extracts these values using direct structured search techniques or existing NLP techniques to determine document information, such as headers, section titles, page titles, web site structure, extracted concepts, information type, metadata, or other data about the content itself that is not within the content, such as location of the content on the website, type or classification details, or the like.

Content identification mechanism 118 generates, augments, and/or updates file structure 122 associated with content 116 with the maintained path information. Additionally, through parsing, structural analysis, hierarchical analysis, concept extraction, or the like, content identification mechanism 118 maintains a set of cross reference information for content 116 as well as any other content 116 identified on the website. Content identification mechanism 118 generates, augments, and/or updates file structure 122 associated with content 116 and the other identified content 116 with this cross reference information. The other identified content may be, for example, such as headers, section titles, page titles, web site structure, extracted concepts, information type, metadata, or other data about the content itself that is not within the content, such as location of the content on the website, type or classification details, or the like, as mentioned above. That is, if this is the first time content identification mechanism 118 has browsed a particular website, then content identification mechanism 118 generates a completely new file structure 122 for path information. Upon subsequent browses of the website, content identification mechanism 118 may either augment file structure 122 with new headers, new types of information, or the like, or update any changed information. The NLP performed by content identification mechanism 118 is especially useful in cases where a website comprises unclear headings or a title. Furthermore, the NLP content identification mechanism 118 is useful to extract concepts or topics that the information is related to, which are then used as pieces of the file structure 122. Therefore, file structure 122 comprises a collection of files throughout that has been either stored on the site or generated from data on the site itself.

Further, on each individual web page where content 116 is located, content identification mechanism 118 also identifies major headings and other grouping structures in order to classify content 116 with a classification identifier, so that content 116 is placed into an appropriate corpus 110 within corpora and/or knowledge domain 112. That is, content identification mechanism 118 looks for links to files with certain extensions, files that are on certain parts of certain pages, information from pages that generate another page or another file, or the like, in order to properly identify the content 116 and thereby generate a classification identifier. Content identification mechanism 118 then ingests and stores content 116 and its related file structure 122 into an appropriate corpus 110 based on the identified classification information.

Thus, content 116 is part of a larger corpus 110 of data or content, which contains electronic content 116 related to a specific topic or a variety of topics. The corpus 110 of data includes any number of content 116 and is stored in any location relative to the NLP system 100. The NLP system 100 is capable of importing any number of content 116 in the corpus 110 of data for processing by the processor 104. The processor 104 communicates with the memory device 102 to store data while the corpus 110 is being processed.

Figure 2:
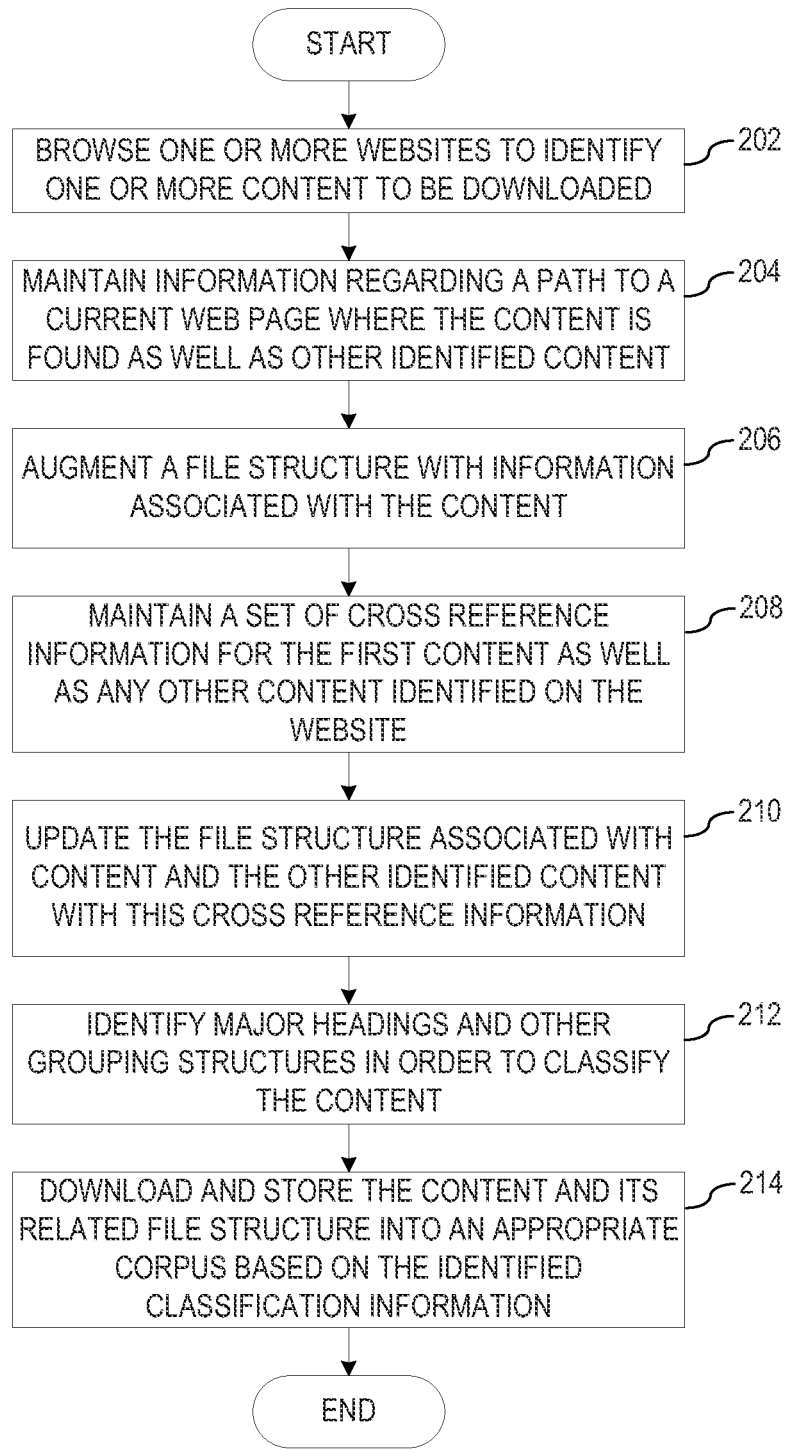
FIG. 2 is a flowchart outlining an example operation for identifying content relationship for content copied by a content identification mechanism in accordance with an illustrative embodiment.

FIG. 2 is a flowchart outlining an example operation for identifying content relationship for content copied by a content identification mechanism in accordance with an illustrative embodiment. As the operation begins, the content identification mechanism uses natural language processing (NLP) to browse one or more websites to identify one or more content to be downloaded (step 202). As the content identification mechanism browses a particular website and identifies the content, the content identification mechanism maintains information regarding relationship content information, such as a path to a current web page where the content is found as well as other identified content, such as headers, section titles, page titles, web site structure, extracted concepts, information type, metadata, or other data about the content itself that is not within the content, such as location of the content on the website, type or classification details, or the like, as mentioned above (step 204). Utilizing this maintained relationship content information, the content identification mechanism modifies a file structure with the relationship content information (step 206). As the content identification mechanism identifies other content on the same website, through parsing, structural analysis, hierarchical analysis, concept extraction, or the like, the content identification mechanism maintains a set of cross reference information for the first content as well as any other content identified on the website (step 208). The content identification mechanism then updates the file structure associated with content and the other identified content with this cross reference information (step 210). At each individual web page where content is located, the content identification mechanism also identifies major headings and other grouping structures in order to classify the content via a classification identifier, so that the content is placed into an appropriate corpus within corpora and/or knowledge domain (step 212). The content identification mechanism then downloads and stores the content and its related file structure into an appropriate corpus based on the identified classification information (step 214), with the operation ending thereafter.

FIG. 3 depicts one example of the information obtained and maintained by a content identification mechanism in searching a website in accordance with the illustrative embodiment. Illustration 300 depicts the results of a browse performed by the content identification mechanism of the illustrative embodiment of the "City of Chicago Second Lien Water Revenue Bonds, Project and Refunding Series 2010A" website. As is illustrated, the content identification mechanism has identified five Portable Document Format (pdf) documents 302, 304, 306, 308, and 310, and three Comma-Separated Value (csv) documents 312, 314, and 316. While all of these documents are related to each other based on being associated with the "City of Chicago Second Lien Water Revenue Bonds, Project and Refunding Series 2010A" website, the content identification mechanism also identifies that documents 304, 306, and 308 are related to each other by being in the same folder 318 and document 302 is also related to documents 304, 306, and 308 by being in folder 320. The content identification mechanism also identifies that while documents 312 and 314 are related to each other, documents 312 and 314 are not related to another other of documents 302, 304, 306, 308, 310, and 316 other than being in the same website. This case also occurs for documents 310 and 316. Thus, for each of documents 302-316, the content identification mechanism maintains information regarding a path to a current web page where the document is found as well as a set of cross reference information identifying the relationship of the document to other documents. This information is stored by the content identification mechanism in the file structure and/or metadata associated with content. Once the content identification mechanism downloads and stores the content and its related data structure and/or metadata into an appropriate corpus based on the identified classification information, the NLP system processes one or more input questions utilizing the content stored in the corpus.

Figure 4:
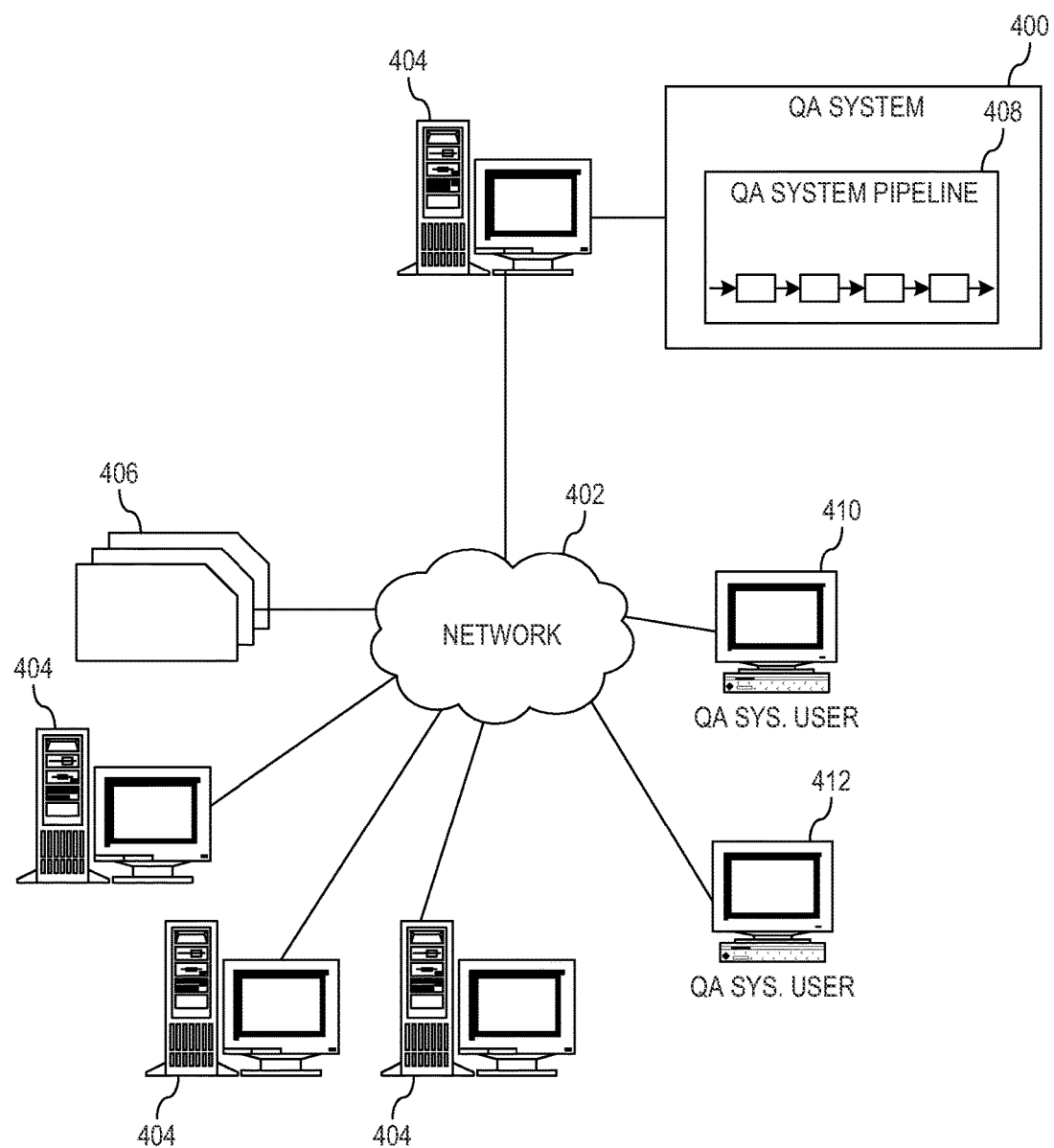
FIG. 4 depicts a schematic diagram of one illustrative embodiment of a question/answer creation (QA) system in a computer network.
Figure 5:
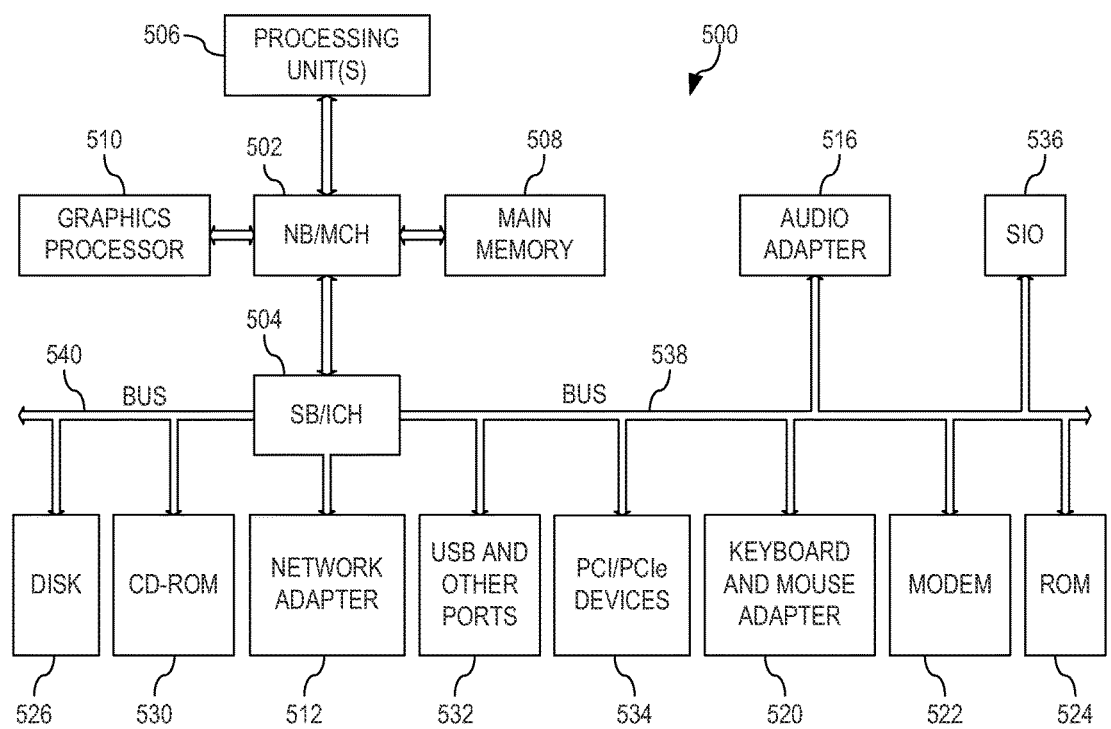
FIG. 5 is a block diagram of an example data processing system in which aspects of the illustrative embodiments may be implemented.
Figure 6:
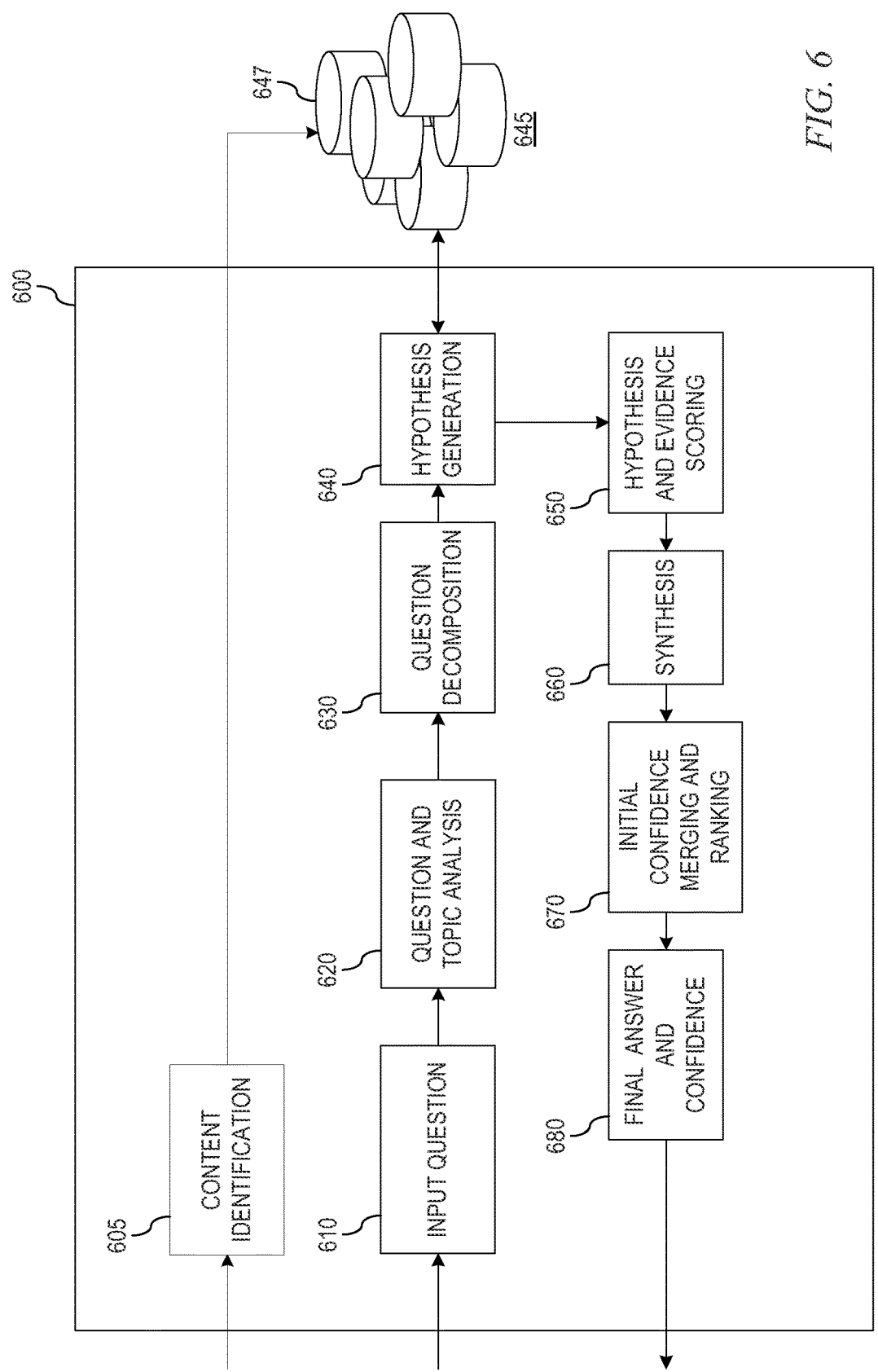
FIG. 6 illustrates a QA system pipeline for processing an input question in accordance with one illustrative embodiment.

As mentioned above, some embodiments of the present invention utilize a NLP system to identify content relationship for content copied by a content identification mechanism. Using contextual clues identified from the information sources themselves, the NLP system identifies and/or approximates the intended structure of the content and transmits the identified and/or approximated structure along with the retrieved and ingested content. Thus, the NLP system maintains a file structure inherent to the retrieved content as well as the content's relationship to other retrieved content based on an original context of the content. While the illustrative embodiments are not limited to such, and any analysis system may be used including other types of natural language processing (NLP) systems, the QA system is used herein as an example implementation of an illustrative embodiment. FIGS. 4-6 are example diagrams of a QA system which may be used with the mechanisms of the present invention in accordance with one illustrative embodiment.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content also answers other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 4 depicts a schematic diagram of one illustrative embodiment of a question/answer creation (QA) system 400 in a computer network 402. One example of a question/answer generation which may be used in conjunction with the principles described herein is described in U.S. Patent Application Publication No. 2011/0125734, which is herein incorporated by reference in its entirety. The QA system 400 is implemented on one or more computing devices 404 (comprising one or more processors and one or more memories, and potentially any other computing device elements generally known in the art including buses, storage devices, communication interfaces, and the like) connected to the computer network 402. The network 402 includes multiple computing devices 404 in communication with each other and with other devices or components via one or more wired and/or wireless data communication links, where each communication link comprises one or more of wires, routers, switches, transmitters, receivers, or the like. The QA system 400 and network 402 enables question/answer (QA) generation functionality for one or more QA system users via their respective computing devices 410-412. Other embodiments of the QA system 400 may be used with components, systems, sub-systems, and/or devices other than those that are depicted herein.

The QA system 400 is configured to implement a QA system pipeline 408 that receive inputs from various sources. For example, the QA system 400 receives input from the network 402, a corpus of data 406, QA system users 410, 412, or other data and other possible sources of input. In one embodiment, some or all of the inputs to the QA system 400 are routed through the network 402. The various computing devices 404 on the network 402 include access points for content creators and QA system users. Some of the computing devices 404 include devices for a database storing the corpus of data 406 (which is shown as a separate entity in FIG. 4 for illustrative purposes only). Portions of the corpus of data 406 are also provided on one or more other network attached storage devices, in one or more databases, or other computing devices not explicitly shown in FIG. 4. The network 402 includes local network connections and remote connections in various embodiments, such that the QA system 400 operates in environments of any size, including local and global, e.g., the Internet.

In one embodiment, the content creator creates content in a document of the corpus of data 406 for use as part of a corpus of data with the QA system 400. The document may include any file, text, article, or source of data for use in the QA system 400. QA system users access the QA system 400 via a network connection or an Internet connection to the network 402, and input questions to the QA system 400 that may be answered by the content in the corpus of data 406. In one embodiment, the questions are formed using natural language. The QA system 400 interprets the question and provides a response to the QA system user, e.g., QA system user 410, containing one or more answers to the question. In some embodiments, the QA system 400 provides a response to users in a ranked list of candidate answers.

The QA system 400 implements a QA system pipeline 408 which comprises a plurality of stages for processing an input question, the corpus of data 406, and generating answers for the input question based on the processing of the corpus of data 406. The QA system pipeline 408 will be described in greater detail hereafter with regard to FIG. 6.

In some illustrative embodiments, the QA system 400 is the Watson™ QA system available from International Business Machines Corporation of Armonk, N.Y., which is augmented with the mechanisms of the illustrative embodiments described hereafter. The Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms look at the matching of terms and synonyms within the language of the input question and the found portions of the corpus of data. Other reasoning algorithms look at temporal or spatial features in the language, while others evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular knowledge domain during the training period of the Watson™ QA system. The statistical model is then used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM® Corporation website, IBM Redbooks®, and the like. For example, information about the Watson™ QA system can be found in Yuan et al., "Watson and Healthcare," IBM developerWorks®, 2011 and "The Era of Cognitive Systems: An Inside Look at IBM Watson and How it Works" by Rob High, IBM Redbooks®, 2012.

FIG. 5 is a block diagram of an exemplary data processing system in which aspects of the illustrative embodiments may be implemented. Data processing system 500 is an example of a computer, such as server 404 or client 410 in FIG. 4, in which computer usable code or instructions implementing the processes for illustrative embodiments of the present invention are located. In one illustrative embodiment, FIG. 5 represents a server computing device, such as a server 104, which implements a QA system 100 and QA system pipeline 108 augmented to include the additional mechanisms of the illustrative embodiments described hereafter.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 500.

As a server, data processing system 500 may be, for example, an IBM® eServer™ System P® computer system, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and are loaded into main memory 508 for execution by processing unit 506. The processes for illustrative embodiments of the present invention are performed by processing unit 506 using computer usable program code, which are located in a memory such as, for example, main memory 508, ROM 524, or in one or more peripheral devices 526 and 530, for example.

A bus system, such as bus 538 or bus 540 as shown in FIG. 5, comprises of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, includes one or more devices used to transmit and receive data. A memory may be, for example, main memory 508, ROM 524, or a cache such as found in NB/MCH 502 in FIG. 5.

Those of ordinary skill in the art will appreciate that the hardware depicted in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

FIG. 6 illustrates a QA system pipeline for processing an input question in accordance with one illustrative embodiment. The QA system pipeline of FIG. 6 may be implemented, for example, as QA system pipeline 408 of QA system 400 in FIG. 4. It should be appreciated that the stages of the QA system pipeline shown in FIG. 6 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 6 may be augmented, for example, in one or more of the stages to implement the improved mechanism of the illustrative embodiments described hereafter, additional stages may be provided to implement the improved mechanism, or separate logic from the pipeline 600 may be provided for interfacing with the pipeline 600 and implementing the improved functionality and operations of the illustrative embodiments.

As shown in FIG. 6, the QA system pipeline 600 comprises a plurality of stages 610-680 through which the QA system operates to analyze an input question and generate a response. In an initial question input stage 610, the QA system receives an input question that is presented in a natural language format. That is, user input is received, via a user interface, an input question for which the user wishes to obtain an answer, e.g., "What is the rating of a U.S. treasury bond today?" or "" Who was the president of the US in 2009?" In response to receiving the input question, the next stage of the QA system pipeline 600, i.e. the question and topic analysis stage 620, parses the input question, using natural language processing (NLP) techniques, for semantic keywords identifying or more predicates, one or more arguments associated with the one or more predicates, and a set of temporal characteristics from the input question, classify the major features according to types, e.g., names, dates, or any of a plethora of other defined topics. For example, in the first example question above, the term "what" is associated with a topic for "bond" indicating that the identity of a treasury bond is being sought, the terms "U.S.," "treasury," and "rating" is identified as a word indicative of declarative or argument criteria, and "today" is indicative of the temporal characteristics. In the second example question, the term "who" is associated with the topic of "president" indicating that the identity of a president is being sought, "US" is identified as a word indicative of declarative or argument criteria, and "2009" is indicative of the temporal characteristics.

The identified major features are then used during the question decomposition stage 630 to decompose the question into one or more queries that are applied to the corpora of data/information 645 in order to generate one or more hypotheses. The queries are generated in any known or later developed query language, such as the Structure Query Language (SQL), or the like. The queries are applied to one or more knowledge domains or databases storing information about the electronic texts, documents, articles, websites, and the like, that make up the corpora of data/information 645. That is, these various sources themselves, collections of sources, and the like, represent different corpus 647 within the corpora 645. There may be different corpus 647 defined for different collections of documents based on various criteria depending upon the particular implementation. For example, different corpora are established for different topics, subject matter categories, sources of information, or the like.

In accordance with the illustrative embodiments, each corpus 647 is composed of a plurality of content and a plurality of file structures, each associated with its respective content. As mentioned above, as a NLP system, such as QA system 600 imports content, a content identification stage 605 browses one or more websites located on other ones of computing devices in order to identify one or more pieces of content to be ingested to corpus 647 within a corpora and/or knowledge domain 645. As the content identification stage 605 browses a particular website, the content identification stage 605 maintains information regarding the path to a current web page where the content is found. That is, content found on web sites may have information; either directly identified or in associated metadata, inherent to the web site that is attributed to the content. This information may be found either in a Uniform Resource Locator (URL) of the web page, an html of the web page, or the like. The content identification stage 605 extracts these values using direct structured search techniques or existing NLP techniques to determine document information, such as headers, section titles, page titles, web site structure, extracted concepts, information type, or other data about the content itself that is not within the content, such as location of the content on the website, type or classification details, or the like.

The content identification stage 605 generates, augments, and/or updates a file structure associated with the content with the maintained path information. Additionally, through parsing, structural analysis, hierarchical analysis, concept extraction, or the like, the content identification stage 605 maintains a set of cross reference information for the content as well as any other content identified on the website. The content identification stage 605 updates the file structure associated with the content and the other identified content with this cross reference information. Further, on each individual web page where the content is located, the content identification stage 605 also identifies major headings and other grouping structures in order to classify the content with a classification identifier, so that the content is placed into an appropriate corpus 647 within corpora and/or knowledge domain 645. The content identification stage 605 then ingests and stores the content and its related file structure into an appropriate corpus 647 based on the identified classification information. As one example, a first corpus is associated with healthcare documents while a second corpus is associated with financial documents. Alternatively, one corpus is documents published by the U.S. Department of Energy while another corpus is IBM® Redbooks® documents. Any collection of content having some similar attribute may be considered to be a corpus 647 within the corpora 645.

The queries are applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 640 to generate results identifying potential hypotheses for answering the input question which can be evaluated. That is, the application of the queries results in the extraction of portions of the corpus of data/information matching the criteria of the particular query. These portions of the corpus are then analyzed and used, during the hypothesis generation stage 640, to generate hypotheses for answering the input question. These hypotheses are also referred to herein as "candidate answers" for the input question. For any input question, at this stage 640, there may be hundreds of hypotheses or candidate answers generated that need to be evaluated.

The QA system pipeline 600, in stage 650, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Further, hypothesis and evidence scoring stage 650 also determines whether there is missing information and or ambiguous information that would increase the scoring of each candidate answer. That is, if a given candidate answer meets one or more of the annotators associated with the received question but has an additional annotator that is not identifiable or is unclear in the corpus of data/information 645, then hypothesis and evidence scoring stage 650 associates this missing or ambiguous information with the given candidate answer. Each reasoning algorithm in hypothesis and evidence scoring stage 650 generates a score based on the analysis it performs which indicates a measure of relevance of the individual portions of the corpus of data/information extracted by application of the queries, a measure of the missing or ambiguous information, as well as a measure of the correctness of the corresponding hypothesis, i.e. a measure of confidence in the hypothesis.

In the synthesis stage 660, the large number of relevance scores generated by the various reasoning algorithms is synthesized into confidence scores for the various hypotheses. This process may involve applying weights to the various scores, where the weights have been determined through training of the statistical model employed by the QA system and/or dynamically updated, as described hereafter. The weighted scores are processed in accordance with a statistical model generated through training of the QA system that identifies a manner by which these scores are combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by an initial confidence merging and ranking stage 670 which compare the confidence scores and measures, compare them against predetermined thresholds, or perform any other analysis on the confidence scores to determine which hypotheses/candidate answers are the most likely to be the answer to the input question. The hypotheses/candidate answers are ranked according to these comparisons to generate an initial ranked listing of hypotheses/candidate answers (hereafter simply referred to as "initial candidate answers").

At stage 680, a final answer and confidence score, or final set of candidate answers and confidence scores, are generated using the final weights and output to the submitter of the original input question. The set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system. As shown in FIG. 6, in accordance the illustrative embodiments, after stage 680, or as part of stage 680, the set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system.

The processes described above may be done repeatedly as the user sees fit until the user is satisfied with the state of the ranked listing of candidate answers and the corresponding evidence passages associated with the candidate answers in the ranked listing of candidate answers. This information is then stored in association with the input question, an identifier of the input question, one or more of the queries generated based on the input question, or the like, for later retrieval and use. This stored information is used for training purposes to train the QA system, e.g., training the operation of the statistical model of the QA system, modifying weights assigned to reasoning algorithms, or the like. This information is also used to compare results generated by the QA system when evaluating a subsequent submission of the same or similar input question in order to see how the corpus of data/information has changed over time and/or how these changes have changed the resulting candidate answers generated by the QA system, e.g., comparing the stored candidate answers and corresponding evidence passages with the later generated candidate answers and corresponding evidence passages and identifying the differences. The stored information is also used as a cache of sorts to provide a quick retrieval of results of similar input questions or similar queries. Other uses of the stored information may also be made based on the operation of the mechanisms of the illustrative embodiments generating this stored information.

Thus, using the mechanisms described above, or equivalent mechanisms in other QA systems generally known in the art which are augmented to include the GUI logic mechanisms of the illustrative embodiments, a system is developed that can be used to analyze natural language questions to alter the confidence scores of answers produced by a QA system based on temporal sensitivity of predicates and/or arguments associated with the predicates in the questions. Both one or more predicates and one or more arguments associated with the one or more predicates are required for defining temporal characteristics, because the exact object under investigation changes the semantics of temporal operators.

As noted above, it should be appreciated that the illustrative embodiments may take the form of an entirely hardware embodiment, an entirely software embodiment, or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory configured to implement a natural language processing (NLP) system, for identifying content relationship for content copied by a content identification mechanism, the method comprising:
  executing, by the processor of a computing device, a content identification mechanism, the content identification mechanism being resident in the memory device of the computing device;
  identifying, by the content identification mechanism in the data processing system, the content from a website on another data processing system via a network using natural language processing (NLP);
  generating, by the content identification mechanism, a file structure in the data processing system, wherein the file structure comprises the content parsed into a hierarchy and a set of cross reference information for the hierarchy;
  populating, by the content identification mechanism, the file structure with path information for the content on the other data processing system that identifies a path to a current web page of the website;
  identifying, by the content identification mechanism, relationship content information associated with the current web page based on at least one of the set of cross reference information or contextual clues of the content, wherein the relationship content is a path to a current web page where the relationship content is found as well as other identified content, including headers, section titles, page titles, web site structure, extracted concepts, information type, metadata, or other data about the content itself that is not within the content, including location of the content on the website, type or classification details of the website;
  modifying, by the content identification mechanism, the file structure associated with the content with the relationship content information, wherein modifying the file structure associated with the content with the relationship content information is performed either through generating a new file structure with the path information as well as other identified content, augmenting an existing file structure with new information, or updating the existing file structure with a change in the path information or the other identified content;
  identifying, by the content identification mechanism, one or more classification identifiers associated with the web page in order to classify the content from the website;
  ingesting, by the content identification mechanism, the content from the website on the other data processing system via the network;
  transmitting, by the content identification mechanism, the content and the file structure associated with the content to a specific corpus in the NLP system based on the one or more classification identifiers so that the NLP system may respond to inquiries using the content and information in the file structure associated with the content;
  responsive to the content identification mechanism identifying changes to the content or the relationship content from the website or information associated with the current web page where the content is found on the website, updating, by the content identification mechanism, the file structure associated with the content thereby forming an updated file structure;
  transmitting, by the content identification mechanism, the updated file structure associated with the content to the specific corpus in the NLP system based on the one or more classification identifiers so that the NLP system may respond to new inquiries using the content and information in the updated file structure associated with the content;
  receiving, by a Question Answering (QA) system, a first question from a first user;
  processing the first question, by one or more software engines of the QA system, using the updated file structure, into one or more queries to apply to a corpora and/or knowledge domain;
  generating, by the QA system, one or more potential candidate answers for answering the first question;
  generating, by the QA system, a confidence score for the one or more potential candidate answers to the first question, wherein the score is determined by comparing the one or more candidate answers to the first question using one or more reasoning algorithms;
  generating a first set ranked list of candidate answers based on the confidence score for the one or more candidate answers;
  storing the generated first set ranked list of candidate answers, by the QA system, in association with the first question received by the first user;
  receiving, by the Question Answering (QA) system, a second question from a second user subsequent to the first question, the second question being the same as the first question received by the first user;
  processing the second question, by one or more software engines of the QA system, using the updated file structure, into one or more queries to apply to a corpora and/or knowledge domain;
  generating, by the QA system, one or more potential candidate answers for answering the second question;
  generating, by the QA system, a confidence score for the one or more potential candidate answers to the second question, wherein the score is determined by comparing the one or more candidate answers to the second question using one or more reasoning algorithms;
  generating a second set ranked list of candidate answers based on the confidence score for the one or more candidate answers to the second question;
  comparing, by the QA system, the generated second set ranked list of candidate answers to the second question to the stored generated first set ranked list of candidate answers to the first question; and
  identifying, by the QA system, differences between the first set ranked list of candidate answers to the second set ranked list of candidate answers.

2. The method of claim 1, further comprising:
  identifying, by the content identification mechanism, other content on the website on the other data processing system via the network;

identifying, by the content identification mechanism, cross reference information between the content and the other content;

updating, by the content identification mechanism, the file structure associated with content with the cross reference information; and transmitting, by the content identification mechanism, the updated file structure associated with the content to the specific corpus in the NLP system based on the one or more classification identifiers.

3. The method of claim 2, wherein the file structure of the other content is updated with the cross reference information associated with the content.

4. The method of claim 2, wherein the cross reference information is identified using at least one of the group consisting of: parsing, structural analysis, hierarchical analysis, or concept extraction.

5. The method of claim 1, wherein the relationship content information is identified from a Uniform Resource Locator (URL) of the web page or an HyperText Markup Language (HTML) of the web page and wherein the relationship content information is utilized to determine document information directly identified in the content or associated with the content.

6. The method of claim 1, wherein each content is selected from a group comprising a document, a video, an audio file, a recording, a picture, an artifact, an entry, or data.

7. The method of claim 1, wherein the content identification mechanism comprises at least one of the group consisting of: an Internet bot, a web crawler, a web scraper, a web spider, an ant, or an automatic indexer.

8. A computer program product comprising a computer readable storage medium having a computer readable program stored therein, wherein the computer readable program, when executed on a computing device, causes the computing device to:

execute, by the processor of a computing device, a content identification mechanism, the content identification mechanism being resident in the memory device of the computing device;

identify content from a website on another computing device via a network using natural language processing (NLP);

generating, by the content identification mechanism, a file structure in the data processing system, wherein the file structure comprises the content parsed into a and a set of cross reference information for the hierarchy;

populate the file structure with path information for the content on the other data processing system that identifies a path to a current web page of the website;

identify relationship content information associated with the current web page based on at least one of the set of cross reference information or contextual clues of the content, wherein the relationship content is a path to a current web page where the relationship content is found as well as other identified content, including headers, section titles, page titles, web site structure, extracted concepts, information type, metadata, or other data about the content itself that is not within the content, including location of the content on the website, type or classification details of the website;

modify the file structure associated with the content with the relationship content information, wherein modifying the file structure associated with the content with the relationship content information is performed either through generating a new file structure with the path information as well as other identified content, augmenting an existing file structure with new information, or updating the existing file structure with a change in the path information or the other identified content and;

identify one or more classification identifiers associated with the web page in order to classify the content from the website;

ingesting, by the content identification mechanism, the content from the website on the other computing device via the network;

transmit the content and the file structure associated with the content to a specific corpus in a NLP system based on the one or more classification identifiers so that the NLP system may respond to inquiries using the content and information in the file structure associated with the content;

responsive to the content identification mechanism identifying changes to the content or the relationship content from the website or information associated with the current web page where the content is found on the website, update the file structure associated with the content thereby forming an updated file structure; and transmit the updated file structure associated with the content to the specific corpus in the NLP system based on the one or more classification identifiers so that the NLP system may respond to new inquiries using the content and information in the updated file structure associated with the content;

receive, by a Question Answering (QA) system, a first question from a first user;

process the first question, by one or more software engines of the QA system, using the updated file structure, into one or more queries to apply to a corpora and/or knowledge domain;

generate, by the QA system, one or more potential candidate answers for answering the first question;

generate, by the QA system, a confidence score for the one or more potential candidate answers to the first question, wherein the score is determined by comparing the one or more candidate answers to the first question using one or more reasoning algorithms;

generate a first set ranked list of candidate answers based on the confidence score for the one or more candidate answers;

store the generated first set ranked list of candidate answers, by the QA system, in association with the first question received by the first user;

receive, by the Question Answering (QA) system, a second question from a second user subsequent to the first question, the second question being the same as the first question received by the first user;

process the second question, by one or more software engines of the QA system, using the updated file structure, into one or more queries to apply to a corpora and/or knowledge domain;

generate, by the QA system, one or more potential candidate answers for answering the second question;

generate, by the QA system, a confidence score for the one or more potential candidate answers to the second question, wherein the score is determined by comparing the one or more candidate answers to the second question using one or more reasoning algorithms;

generate a second set ranked list of candidate answers based on the confidence score for the one or more candidate answers to the second question;

compare, by the QA system, the generated second set ranked list of candidate answers to the second question to the stored generated first set ranked list of candidate answers to the first question; and identify, by the QA system, differences between the first set ranked list of candidate answers to the second set ranked list of candidate answers.

9. The computer program product of claim 8, wherein the computer readable program further causes the computing device to:
- identify other content on the website on the other computing device via the network;
- identify cross reference information between the content and the other content;
- update the file structure associated with content with the cross reference information; and
- transmit the updated file structure associated with the content to the specific corpus in the NLP system based on the one or more classification identifiers.

10. The computer program product of claim 9, wherein the file structure of the other content is updated with the cross reference information associated with the content.

11. The computer program product of claim 9, wherein the cross reference information is identified using at least one of the group consisting of: parsing, structural analysis, hierarchical analysis, or concept extraction.

12. The computer program product of claim 8, wherein the relationship content information is identified from a Uniform Resource Locator (URL) of the web page or an HyperText Markup Language (HTML) of the web page and wherein the relationship content information is utilized to determine document information directly identified in the content or associated with the content.

13. The computer program product of claim 8, wherein the content identification mechanism comprises at least one of the group consisting of: an Internet bot, a web crawler, a web scraper, a web spider, an ant, or an automatic indexer.

14. An apparatus comprising:
- a processor; and
- a memory coupled to the processor, wherein the memory comprises instructions which, when executed by the processor, cause the processor to:
- execute, by the processor of a computing device, a content identification mechanism, the content identification mechanism being resident in the memory device of the computing device;
- identify content from a website on another apparatus via a network using natural language processing (NLP);
- generate, by the content identification mechanism, a file structure in the data processing system, wherein the file structure comprises the content parsed into a hierarchy and a set of cross reference information for the hierarchy;
- populate the file structure with path information for the content on the other apparatus that identifies a path to a current web page of the website;
- identify relationship content information associated with the current web page based on at least one of the set of cross reference information or contextual clues of the content, wherein the relationship content is a path to a current web page where the relationship content is found as well as other identified content, including headers, section titles, page titles, web site structure, extracted concepts, information type, metadata, or other data about the content itself that is not within the content, including location of the content on the website, type or classification details of the website;
- modify the file structure associated with the content with the relationship content information, wherein modifying the file structure associated with the content with the relationship content information is performed either through generating a new file structure with the path information as well as other identified content, augmenting an existing file structure with new information, or updating the existing file structure with a change in the path information or the other identified content;
- identify one or more classification identifiers associated with the web page in order to classify the content from the website;
- transmit the content and the file structure associated with the content to a specific corpus in a NLP system based on the one or more classification identifiers so that the NLP system may respond to inquiries using the content and information in the file structure associated with the content;
- responsive to the content identification mechanism identifying changes to the content or the relationship content from the website or information associated with the current web page where the content is found on the website, update the file structure associated with the content thereby forming an updated file structure;
- transmit the updated file structure associated with the content to the specific corpus in the NLP system based on the one or more classification identifiers so that the NLP system may respond to new inquiries using the content and information in the updated file structure associated with the content;
- receive, by a Question Answering (QA) system, a first question from a first user;
- process the first question, by one or more software engines of the QA system, using the updated file structure, into one or more queries to apply to a corpora and/or knowledge domain;
- generate, by the QA system, one or more potential candidate answers for answering the first question;
- generate, by the QA system, a confidence score for the one or more potential candidate answers to the first question, wherein the score is determined by comparing the one or more candidate answers to the first question using one or more reasoning algorithms;
- generate a first set ranked list of candidate answers based on the confidence score for the one or more candidate answers;
- store the generated first set ranked list of candidate answers, by the QA system, in association with the first question received by the first user;
- receive, by the Question Answering (QA) system, a second question from a second user subsequent to the first question, the second question being the same as the first question received by the first user;
- process the second question, by one or more software engines of the QA system, using the updated file structure, into one or more queries to apply to a corpora and/or knowledge domain;
- generate, by the QA system, one or more potential candidate answers for answering the second question;
- generate, by the QA system, a confidence score for the one or more potential candidate answers to the second question, wherein the score is determined by comparing the one or more candidate answers to the second question using one or more reasoning algorithms;
- generate a second set ranked list of candidate answers based on the confidence score for the one or more candidate answers to the second question;
- compare, by the QA system, the generated second set ranked list of candidate answers to the second question to the stored generated first set ranked list of candidate answers to the first question; and identify, by the QA system, differences between the first set ranked list of candidate answers to the second set ranked list of candidate answers.

15. The apparatus of claim 14, wherein the instructions further cause the processor to:

identify other content on the website on the other computing device via the network;

identify cross reference information between the content and the other content;

update the file structure associated with content with the cross reference information; and transmit the updated file structure associated with the content to the specific corpus in the NLP system based on the one or more classification identifiers.

16. The apparatus of claim 15, wherein the file structure of the other content is updated with the cross reference information associated with the content.

17. The apparatus of claim 15, wherein the cross reference information is identified using at least one of the group consisting of: parsing, structural analysis, hierarchical analysis, or concept extraction.

18. The apparatus of claim 14, wherein the path information is identified from a Uniform Resource Locator (URL) of the web page or an HyperText Markup Language (HTML) of the web page and wherein the path information is utilized to determine document information directly identified in the content or associated with the content.

19. The apparatus of claim 15, wherein the content identification mechanism comprises at least one of the group consisting of: an Internet bot, a web crawler, a web scraper, a web spider, an ant, or an automatic indexer.

* * * * *